US009819701B2

(12) United States Patent
Kalapatapu et al.

(10) Patent No.: US 9,819,701 B2
(45) Date of Patent: Nov. 14, 2017

(54) LOW LATENCY IMS-BASED MEDIA HANDOFF BETWEEN A CELLULAR NETWORK AND A WLAN

(71) Applicant: Avago Technologies General IP (Singapore) Pte. Ltd., Singapore (SG)

(72) Inventors: Dutt Kalapatapu, Santa Clara, CA (US); Kamesh Medapalli, San Jose, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 212 days.

(21) Appl. No.: 13/926,692

(22) Filed: Jun. 25, 2013

(65) Prior Publication Data

US 2014/0376511 A1    Dec. 25, 2014

(51) Int. Cl.
| | |
|---|---|
| *H04W 80/04* | (2009.01) |
| *H04W 36/18* | (2009.01) |
| *H04L 29/06* | (2006.01) |
| *H04W 36/00* | (2009.01) |
| *H04W 36/14* | (2009.01) |
| *H04W 60/00* | (2009.01) |

(52) U.S. Cl.
CPC ...... *H04L 65/1016* (2013.01); *H04L 65/1083* (2013.01); *H04W 36/18* (2013.01); *H04W 36/0011* (2013.01); *H04W 36/14* (2013.01); *H04W 60/005* (2013.01)

(58) Field of Classification Search
CPC ....... H04Q 7/00; H04Q 7/24; H04W 36/0016; H04L 65/1016; H04L 65/1083
USPC .......................................................... 370/331
See application file for complete search history.

(56) References Cited

U.S. PATENT DOCUMENTS

| | | | |
|---|---|---|---|
| 7,664,495 B1 * | 2/2010 | Bonner .................. | H04W 4/16 370/338 |
| 2005/0227692 A1 * | 10/2005 | Kawashima et al. ...... | 455/435.2 |
| 2006/0140149 A1 * | 6/2006 | Kim .................. | H04L 29/06027 370/331 |
| 2006/0246903 A1 * | 11/2006 | Kong .................. | H04M 1/2535 455/437 |
| 2009/0055899 A1 * | 2/2009 | Deshpande ......... | H04L 65/1069 726/4 |
| 2009/0190533 A1 * | 7/2009 | Zhu .................. | H04L 29/12188 370/328 |
| 2011/0188425 A1 * | 8/2011 | Rydnell ................ | H04W 40/00 370/311 |

(Continued)

*Primary Examiner* — Andrew Chriss
*Assistant Examiner* — Voster Preval
(74) *Attorney, Agent, or Firm* — Sterne, Kessler, Goldstein & Fox P.L.L.C.

(57) ABSTRACT

Methods for transporting a media call between an IMS server and a User Equipment (UE) and of handing over the media call between a cellular network and a WLAN are provided. In an embodiment, the media call data and signaling are split such that the data is transported over the WLAN and the signaling is transported over the cellular network. In another embodiment, handover latency is reduced by using a dual registration process that registers the UE with an IMS server using both a WLAN-based contact and a cellular network-based contact. The media call can then be carried over the WLAN and/or the cellular network and can be handed over seamlessly from one to the other within minimal signaling.

20 Claims, 13 Drawing Sheets

(56) References Cited

U.S. PATENT DOCUMENTS

2014/0176659 A1\* 6/2014 Khay-Ibbat ............ H04N 7/148
　　　　　　　　　　　　　　　　　　　　　348/14.02

\* cited by examiner

LOW LATENCY IMS-BASED MEDIA HANDOFF BETWEEN A CELLULAR NETWORK AND A WLAN

BACKGROUND

Field of the Invention

The present disclosure relates generally to media handoff between a cellular network and Wireless Local Area Network (WLAN).

Background Art

Internet Protocol (IP) Multimedia Subsystem (IMS) is an architectural framework defined by $3^{rd}$ Generation Partnership Project (3GPP) for delivering IP-based multimedia services, including voice, video, and/or Short Message Service (SMS) to User Equipments (UEs). While IP-based multimedia services can be provided over both a cellular network and a wireless local area network (WLAN), the standard-defined handover process of the services between the two networks requires a significant amount of time that degrade user experience.

BRIEF DESCRIPTION OF THE DRAWINGS/FIGURES

The accompanying drawings, which are incorporated herein and form a part of the specification, illustrate the present disclosure and, together with the description, further serve to explain the principles of the disclosure and to enable a person skilled in the pertinent art to make and use the disclosure.

The present disclosure will be described with reference to the accompanying drawings. Generally, the drawing in which an element first appears is typically indicated by the leftmost digit(s) in the corresponding reference number.

DETAILED DESCRIPTION OF EMBODIMENTS

In the following disclosure, terms defined by the Long-Term Evolution (LTE) standard are sometimes used. For example, the term "eNodeB" is used to refer to what is commonly described as a base station (BS) or a base transceiver station (BTS) in other standards. The term "User Equipment (UE)" is used to refer to what is commonly described as a mobile station (MS) or mobile terminal in other standards. However, as will be apparent to a person of skill in the art based on the teachings herein, embodiments are not limited to the LTE standard and can be applied to other cellular communication standards (e.g., Evolved High-Speed Packet Access (HSPA+), Wideband Code Division Multiple Access (W-CDMA), CDMA2000, Time Division-Synchronous Code Division Multiple Access (TD-SCDMA), Global System for Mobile Communications (GSM), General Packet Radio Service (GPRS), Enhanced Data Rates for GSM Evolution (EDGE), Worldwide Interoperability for Microwave Access (WiMAX), etc.).

Figure 1:
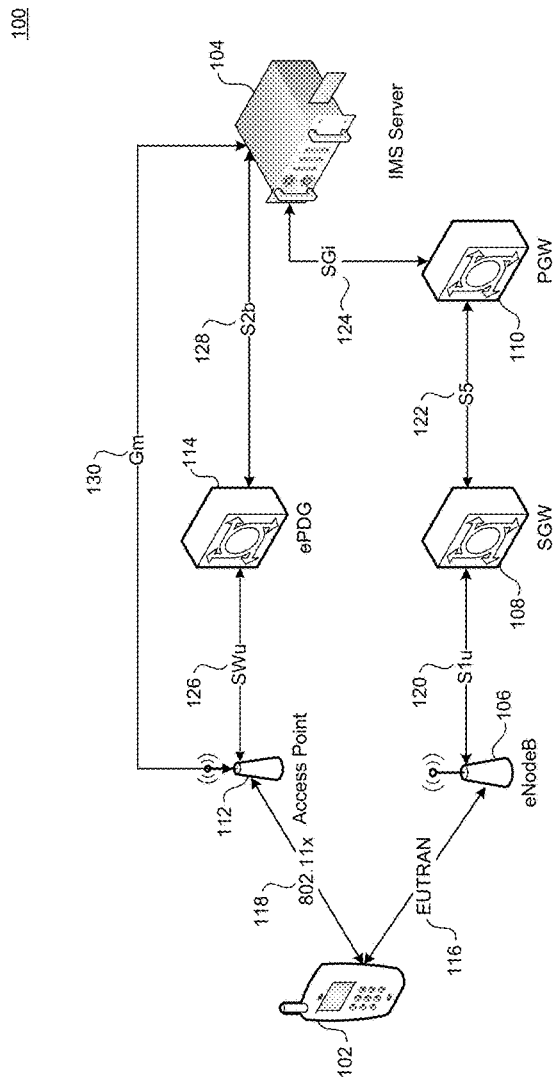
FIG. 1 is an example network in which embodiments can be practiced or implemented.

FIG. 1 is an example network 100 in which embodiments can be practiced or implemented. Example network 100 is provided for the purpose of illustration only and is not limiting of embodiments. As shown in FIG. 1, example network 100 includes a user equipment (UE) 102, an Internet Protocol (IP) Multimedia Subsystem (IMS) server 104, an Evolved Node B ("eNodeB") 106, a Serving Gateway (SGW) 108, a Packet Data Network (PDN) Gateway (PGW) 110, a Wireless Local Area Network (WLAN) Access Point (AP) 112, and an Evolved Packet Data Gateway (ePDG) 114.

SGW 108, PGW 110, and ePDG 114 are components of the Evolved Packet Core (EPC) of the LTE standard. IMS server 104 is a component of an architectural framework defined by $3^{rd}$ Generation Partnership Project (3GPP) for delivering IP-based multimedia services, including voice, video, and/or Short Message Service (SMS). IMS server 104 can be implemented within an LTE network infrastructure, for example.

As shown in FIG. 1, UE 102 can connect in various ways to IMS server 104. For example, UE 102 can connect to IMS server 104 via the LTE network by connecting over an EUTRAN (Evolved UMTS Terrestrial Radio Access Network) air interface 116 to eNodeB 106. eNodeB 106 then connects UE 102 to IMS server via SGW 108 and PGW 110. Communication between eNodeB 106 and SGW 108 can be over a S1u interface 120, communication between SGW 108 and PGW 110 can be over an S5 interface 122, and communication between PGW 110 and IMS server 104 can be over a SGi interface 124.

Alternatively, UE 102 can connect to IMS server via the WLAN network by connecting to AP 112 over an 802.11x air interface 118. If AP 112 is trusted (e.g., operator controlled), then AP 112 can connect UE 102 to IMS server 104 directly over a Gm interface 130. Otherwise, AP 112 connects UE 102 to IMS server 104 via ePDG 114, which ensures that the connection from UE 102 to ePDG 114 is secure. Communication between AP 112 and ePDG 114 can be over an SWu interface 126, and communication between ePDG 114 and IMS server 104 can be over a S2b interface 128.

Figure 2:
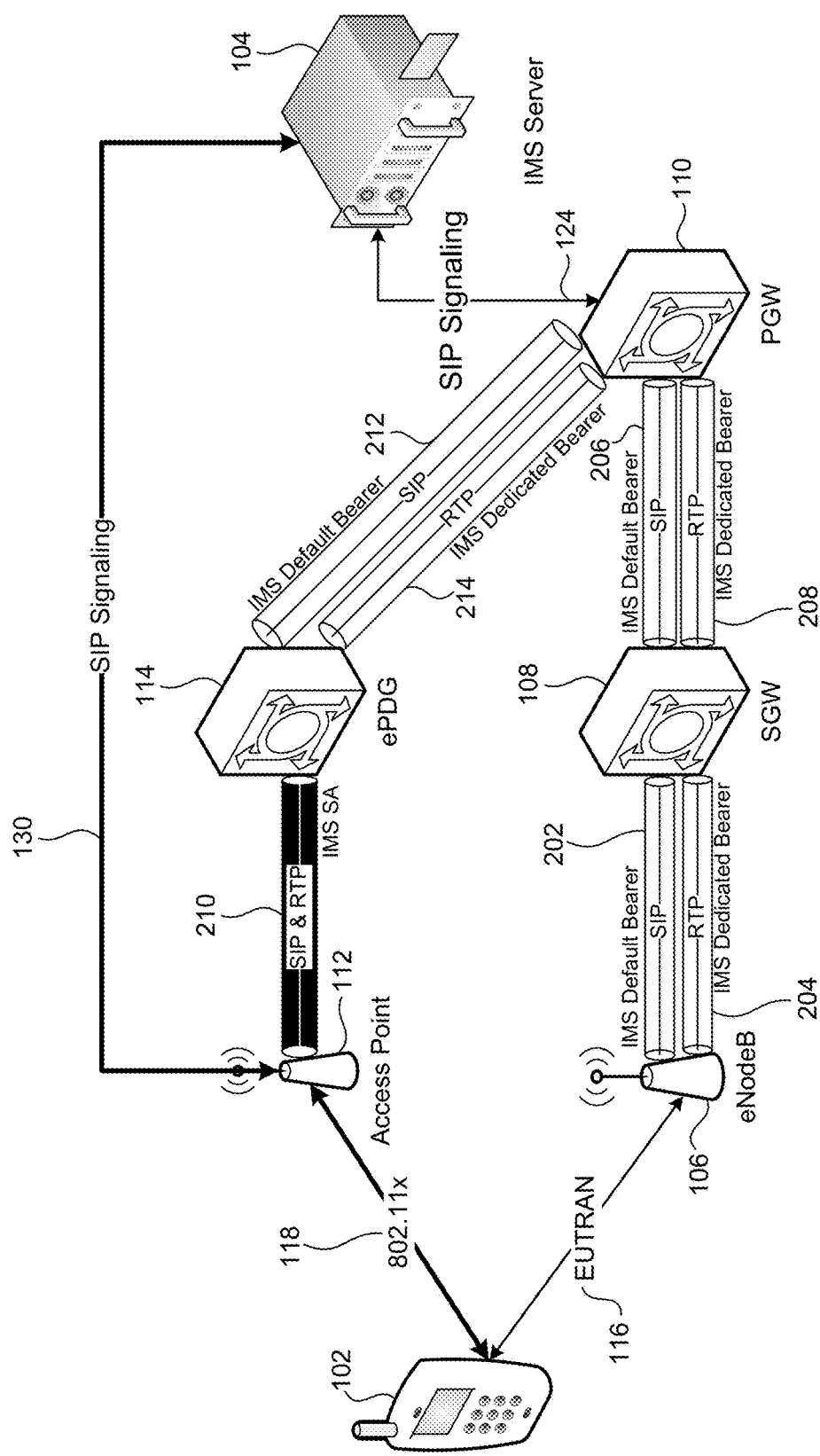
FIG. 2 illustrates example conventional network traffic flows in the example network of FIG. 1.

FIG. 2 illustrates example conventional network traffic flows in example network 100 of FIG. 1. One example traffic flow, via the LTE network, includes setting up separate IP tunnels for transporting data (e.g., voice, video, text, etc.) and signaling (e.g., control) along the path between eNodeB 106 and PGW 110. For example, as shown in FIG. 2, IP tunnels 202 and 206 are dedicated to transport signaling (e.g., Session Initiation Protocol (SIP) messages), and IP tunnels 204 and 208 are dedicated to transport data (e.g., Real-time Transport Protocol (RTP) packets). Within each tunnel, the transported data/signaling (along with any original IP headers) is encapsulated in IP packets. From PGW 110 to IMS server 104, no tunneling is used. Another example traffic flow, via the WLAN network, includes setting up a combined IP tunnel 210 for both data and signaling between AP 112 and ePDG 114 and separate IP tunnels 212 and 214 for transporting respectively signaling and data between ePDG 114 and PGW 110.

Figure 3:
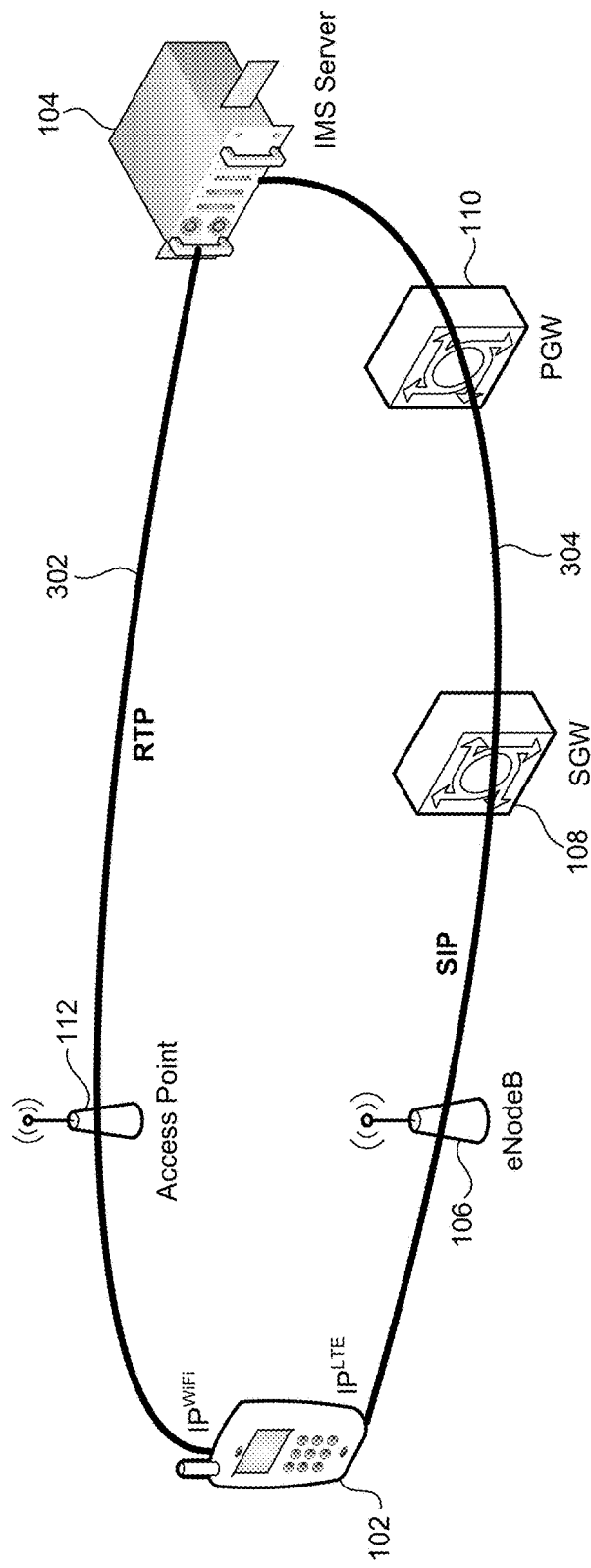
FIG. 3 illustrates an example network traffic flow according to an embodiment.

FIG. 3 illustrates an example network traffic flow 300 according to an embodiment. Example network traffic flow 300 is provided for the purpose of illustration only and is not limiting of embodiments. For the purpose of simplification only, example network traffic flow 300 is shown with respect to a simplified version of example network 100, which omits ePDG 114. However, as would be understood by a person of skill in the art based on the teachings herein, example network traffic flow 300 can be used with or without involving ePDG 114.

As shown in FIG. 3, example network traffic flow 300 includes splitting data and signaling such that data (e.g., RTP packets) is transported between UE 102 and IMS server 104 over a WLAN-enabled path 302 and signaling (e.g., SIP messages) is transported between UE 102 and IMS server 104 over an LTE network-enabled path 304. As described above, WLAN-enabled path 302 may or may not include ePDG 114, depending, for example, on whether AP 112 is trusted or not trusted. Alternatively, the data and signaling paths can be reversed such that signaling is transported over path 302 and data is transported over path 304.

Example network traffic flow 300 provides a number of advantages compared to conventional traffic flows. For example, example network traffic flow 300 can enable cellular network operators that implement GERAN (GSM/EDGE Radio Access Network) or UTRAN (UMTS Terrestrial Radio Access Network) air interfaces (instead of EUTRAN), for example, and that cannot otherwise support heavy traffic media services (e.g., Voice over IP (VoIP) or Video over IP) to provide such services by switching a significant traffic portion of these services to the WLAN network. Similarly, EUTRAN network operators can use example network traffic flow 300 to improve performance for IP-based media services and to provide additional services, such as content sharing, for example.

In an embodiment, the splitting of data and signaling according to example network traffic flow 300 occurs after a media call session (e.g., voice and/or video) has been established between UE 102 and IMS server 104. For example, in an embodiment, the media call session is established using signaling over path 304 between UE 102 and IMS server 104. Data for the established media call session then begins to flow over path 304, in addition to any subsequent signaling required to maintain the media call session. Subsequently, UE 102 can request (with or without user control) that the data flow or the signaling flow be redirected to path 302. IMS server 104 can then decide whether to grant or deny the requested traffic redirection. At a later time, for example, UE 102 can request (with or without user control) that the data flow or the signaling flow be redirected to path 304. In an embodiment, when the requested traffic redirection involves redirecting a flow to path 304 from path 302, IMS server 104 always grants the requested traffic redirection.

Figure 12:
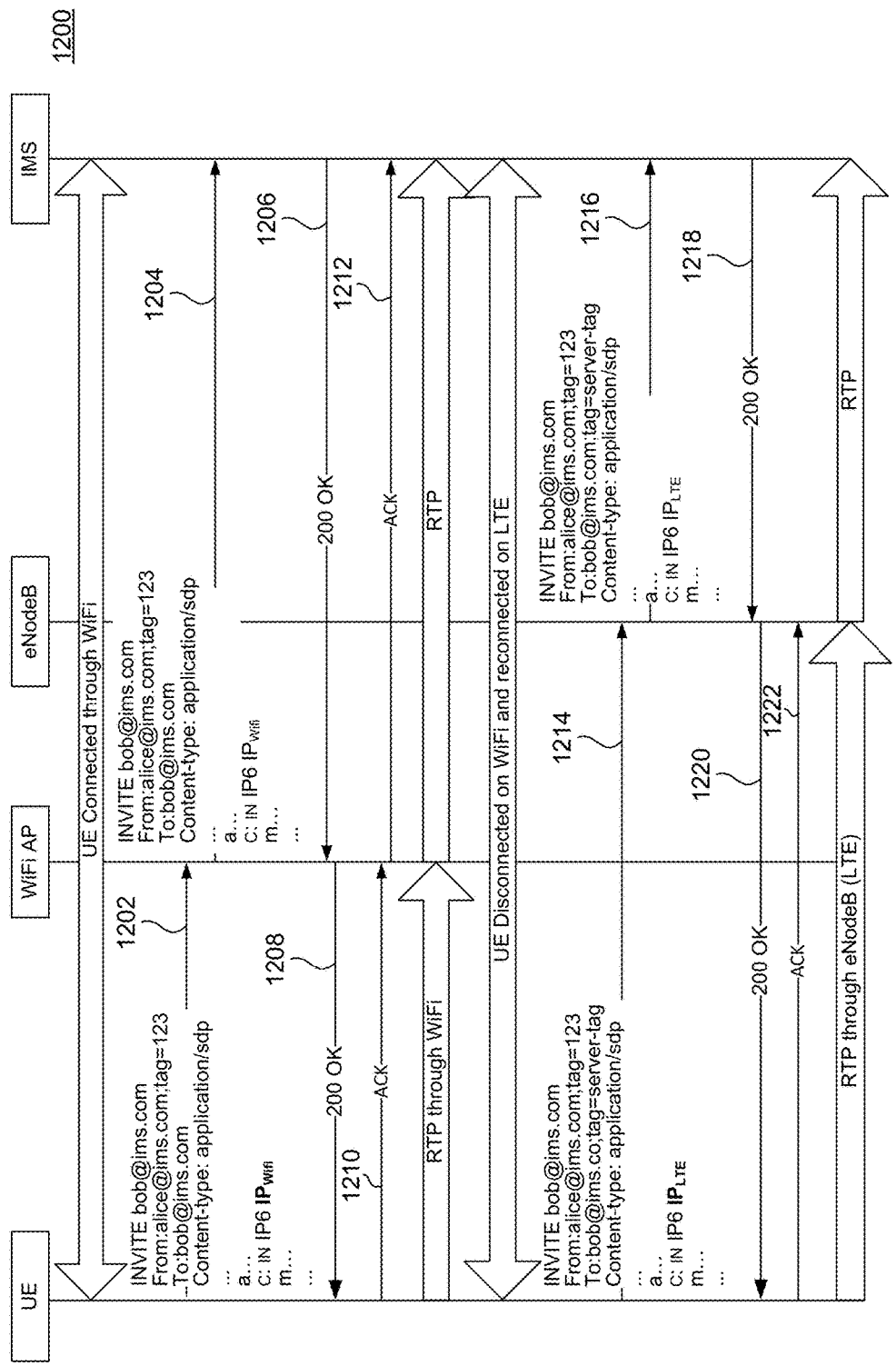
FIG. 12 illustrates an example call flow for performing data flow redirection according to an embodiment.

In an embodiment, the request for traffic redirection includes a SIP INVITE message with Session Description Protocol (SDP) parameters describing the redirection path (e.g., path 302) for IMS server 104. FIG. 12 illustrates an example call flow 1200 for performing a data flow redirection according to an embodiment. Example call flow 1200 is provided for the purpose of illustration only and is not limiting of embodiments. Specifically, example call flow 1200 describes a scenario in which the UE begins by establishing a media call session with the IMS server via a WLAN network, before redirecting the data flow (e.g., RTP) of the established media call session from the WLAN network to an LTE network. As would be understood by a person of skill in the art, similar call flows can be used to perform redirection from the LTE network to the WLAN network.

As shown in FIG. 12, example call flow 1200 begins in step 1202, which includes the UE sending a SIP INVITE message, via a WLAN AP, to the IMS server. The SIP INVITE message specifies the caller and callee of the media call session and includes a number of SDP parameters. For the purpose of simplification, only the 'c' or connection field of the SDP parameters is shown in FIG. 12. The connection field specifies a WLAN-assigned IP address of the UE. In step 1204, the WLAN AP forwards the SIP INVITE message to the IMS server. In response to the SIP INVITE message, the IMS server sends in step 1206 a SIP OK message to the WLAN AP, which forwards the SIP OK message in step 1208 to the UE. The UE acknowledges the SIP OK message by sending an ACK message in step 1210 to the WLAN AP, which forwards the ACK message in step 1212 to the IMS server. At this point, data (e.g., RTP) traffic can begin to flow via the WLAN AP between the UE and the IMS server.

Subsequently, the UE decides to redirect the data flow of the established media call session from the WLAN network to the LTE network. For example, the UE may detect a degradation of the WLAN connection, prompting the user to select whether or not to switch the data flow to the LTE network. Alternatively, the UE may automatically switch the data flow from the WLAN network to the LTE network upon detecting a degradation or a loss of connectivity with the WLAN AP and/or the IMS server.

To redirect the data flow, in step 1214, the UE sends a new SIP INVITE message (SIP re-INVITE), via an eNodeB of the LTE network (e.g., the UE's serving eNodeB), to the IMS server. The SIP INVITE message is similar to the SIP INVITE message sent in step 1202, but instead specifies a LTE-assigned IP of the UE in the connection field of the SDP parameters. The eNodeB forwards the SIP INVITE message in step 1216 to the IMS server. In response to the SIP INVITE message, the IMS server sends in step 1218 a SIP OK message to the eNodeB, which forwards the SIP OK message in step 1220 to the UE. The UE responds with an ACK message to the eNodeB in step 1222. At this point, data (e.g., RTP) traffic can begin to flow via the LTE eNodeB between the UE and the IMS server.

Figure 4:
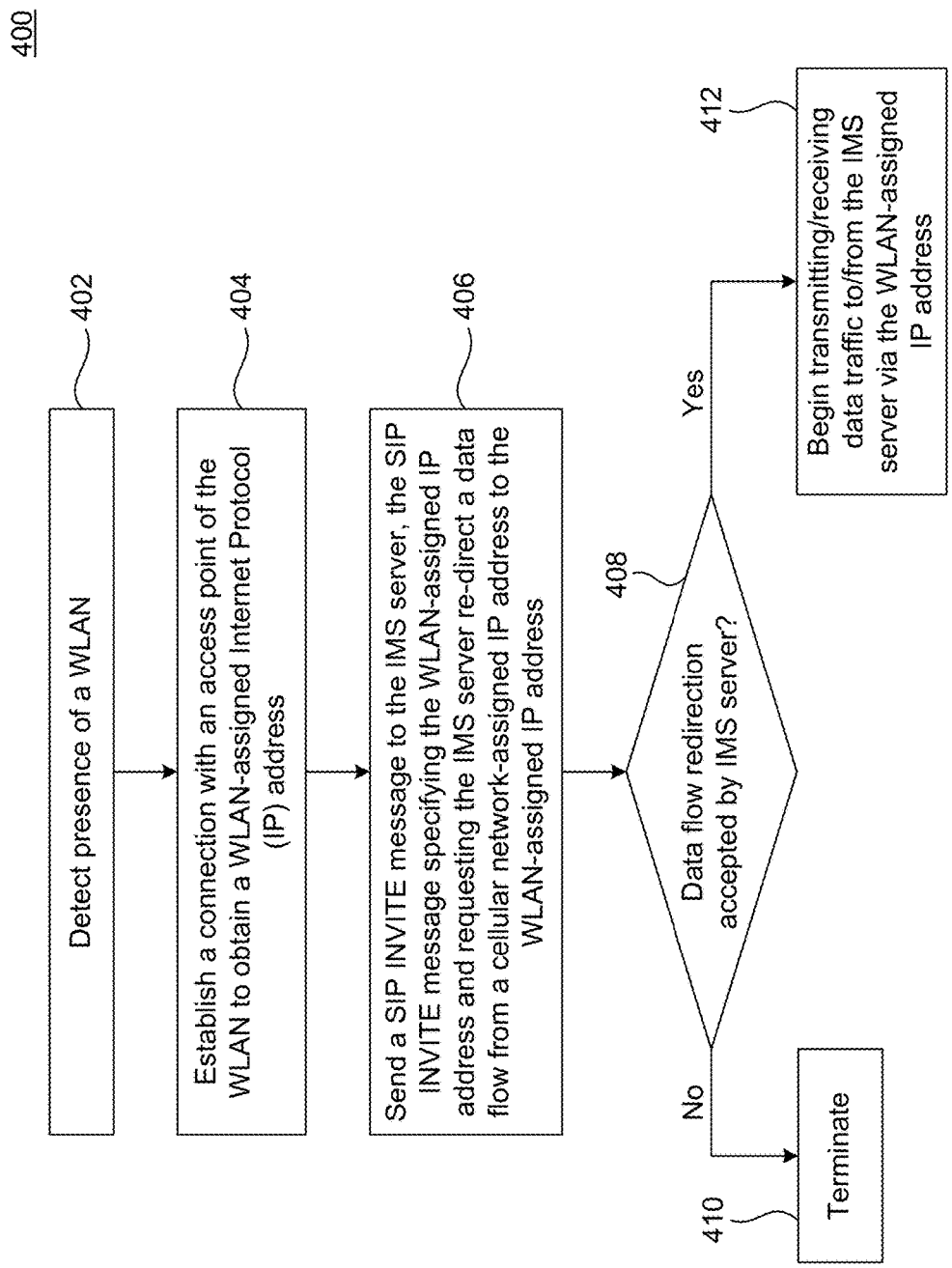
FIG. 4 is an example process according to an embodiment.

FIG. 4 is an example process 400 according to an embodiment. Example process 400 is provided for the purpose of illustration only and is not limiting of embodiments. Example process 400 can be performed by a UE that has a media call session established with an IMS server via a cellular network, using a cellular network-assigned IP address.

As shown in FIG. 4, process 400 begins in step 402, which includes detecting a presence of a WLAN. Step 402 can occur for example when the UE enters a location with an operating WLAN, such as a home, airport, mall, etc. The WLAN can be operator-controller or private.

Step 404 includes establishing a connection with an access point of the WLAN to obtain a WLAN-assigned IP address. In an embodiment, process 400 further includes before step 404 prompting the user of the UE to select whether or not to establish the connection with the access point. Alternatively, step 404 is performed automatically by the UE when the WLAN is known to the UE (e.g., home network, UE's operator network, etc.).

Subsequently, in step 406, process 400 includes sending a SIP INVITE message (or a different signaling protocol message) to the IMS server, with the SIP INVITE message specifying the WLAN-assigned IP address and requesting the IMS server redirect a data flow of the established media call session from the cellular network-assigned IP address to the WLAN-assigned IP address. In an embodiment, process 400 further includes before step 406 prompting the user of the UE to select whether or not data flow redirection from the cellular network to the WLAN is desired. In another embodiment, the user prompt includes a predicted call quality (excellent, good, fair, and poor) if the data flow redirection is performed, which can be used by the user to decide whether or not to proceed with step 406. In another embodiment, step 406 is performed automatically by the UE when the WLAN is known to the UE and/or according to stored user preferences. For example, the user can set a preference to automatically perform the data flow redirection when a home network is available, but for another network (e.g., office network) the UE can request a user prompt before redirection.

Then, step 408 includes determining whether or not the data flow redirection was accepted by the IMS server. In an embodiment, this includes determining whether a SIP OK message has been received from the IMS server within a predetermined time interval. If it is determined that the data flow redirection was not accepted, process 400 terminates in step 410. In an embodiment, the UE can repeat process 400 a set number of times, beginning with step 406, for example, to re-attempt data flow redirection. In another embodiment, the UE can repeat process 400 beginning with step 402 by connecting to another WLAN (e.g., if the data flow redirection was rejected by the IMS server due to issues with the previous WLAN (e.g., ePDG unable to authenticate WLAN AP)).

If the data flow redirection was accepted by the IMS server, process 400 proceeds to step 412, which includes beginning transmitting and/or receiving data traffic to/from the IMS server via the WLAN, using the WLAN-assigned IP address. The UE can maintain a signaling flow of the media call session over the cellular network or can subsequently also redirect the signaling flow onto the WLAN.

Example embodiments that can be used for performing a data flow redirection (and/or a signaling flow redirection) are described above. In the following, example embodiments for reducing the latency of the redirection (or handoff) from a cellular network to a WLAN, or vice versa, are provided.

Figure 5:
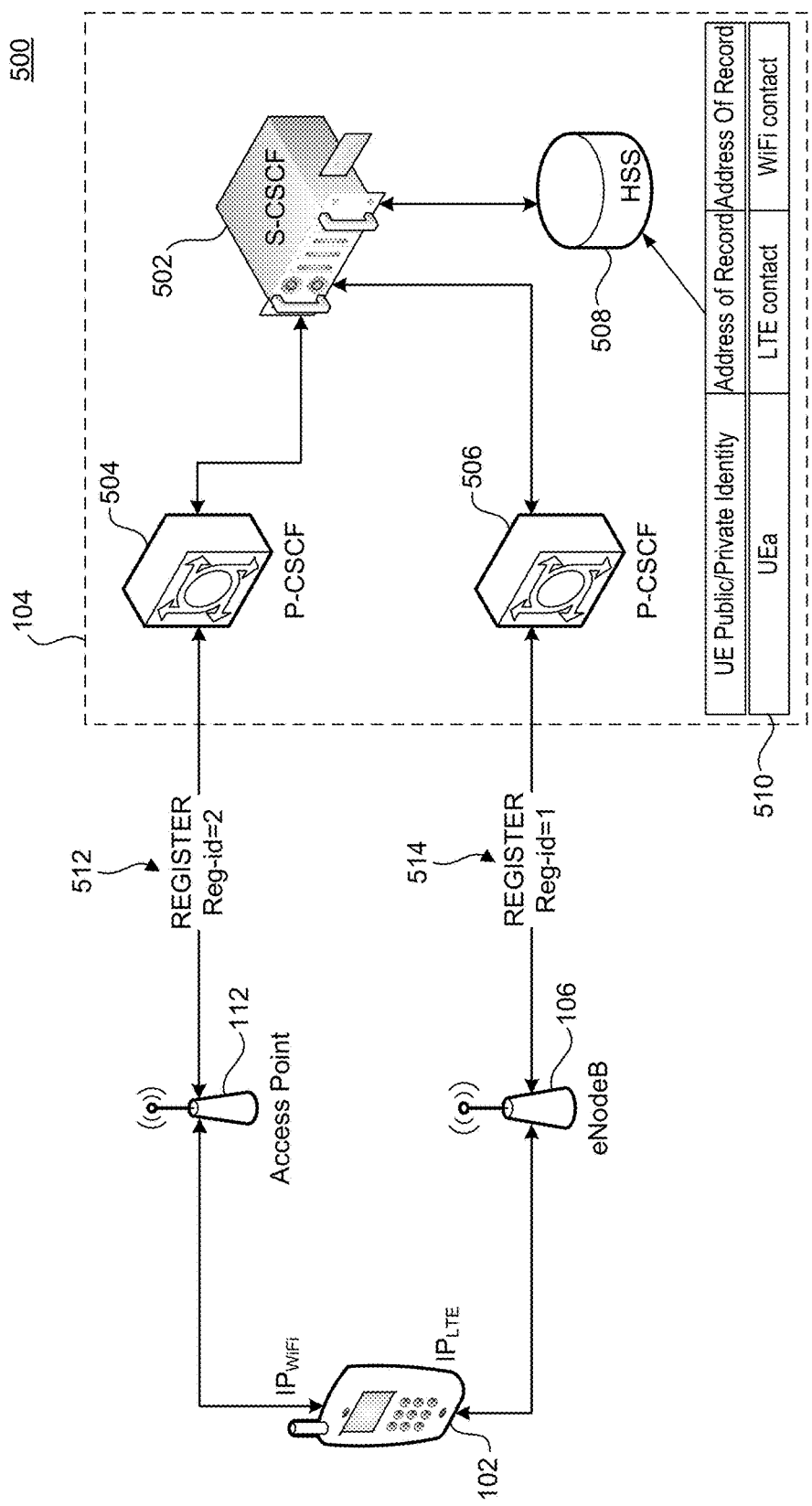
FIG. 5 illustrates an example dual instance registration process according to an embodiment.

FIG. 5 illustrates an example dual instance registration process according to an embodiment. This example process is provided for the purpose of illustration only and is not limiting of embodiments. For the purpose of illustration only, the example process is described with respect to an example network 500, which includes a UE 102, an eNodeB 106, a WLAN AP 112, and an IMS server 104. For the purpose of simplification only, certain components (e.g., of the cellular network) described above are omitted from example network 500.

As shown in FIG. 5, IMS server 104 includes, among other components, a Serving Call Session Control Function node (S-CSCF) 502 and two Proxy Call Session Control Function nodes (P-CSCF) 504 and 506. Collectively, S-CSCF 502 and P-CSCF 504 and 506 process SIP signaling messages in IMS server 104. S-CSCF 502 is a centralized server that can be located in the same or a different geographical region than UE 102. Typically, S-CSCF 502 can be connected to a large number of P-CSCFs (e.g., P-CSCF 504 and 506), which can be distributed geographically by a network operator. For example, P-CSCF 504 and 506 can be P-CSCFs located in the home network of UE 102 (when UE 102 is within its home network) or P-CSCFs located in a visited network (when UE 102 is within a visited network).

Dual instance registration according to an embodiment includes registering the UE, via the WLAN, with IMS server 104 using a private identity of the UE and a WLAN-based contact of the UE; and registering the UE, via the cellular network, with IMS server 104 using the same private identity and a cellular network-based contact of the UE. The WLAN-based contact of the UE includes, for example, a WLAN-assigned IP address of the UE. Similarly, the cellular network-based contact of the UE includes a cellular network-assigned IP address of the UE. As would be understood by a person of skill in the art, the UE can be registered with more than one WLAN according to embodiments.

Registration via the WLAN can be simultaneous with, before, or after the registration via the cellular network. In an embodiment, UE 102 registers with IMS server 104, via the cellular network, on power up after attachment with the cellular network. If cellular attachment is lost, UE 102 re-registers with IMS server 104, via the cellular network, when UE 102 is able to re-attach to the cellular network. Similarly, UE 102 can register or re-register with IMS server 104, via one or more WLANs, when a WLAN connection is present. UE 102 can also de-register from IMS server 104 (via the WLAN or the cellular network).

In an embodiment, P-CSCF 504 can be dedicated for processing WLAN-based traffic and P-CSCF 506 can be dedicated for processing cellular network-based traffic. As such, registration via the WLAN establishes a path 512 that includes P-CSCF 504 between UE 102 and S-CSCF 502, and registration via the cellular network establishes a path 514 that includes P-CSCF 506 between UE 102 and S-CSCF 502.

By using the same private identity in both registrations, S-CSCF 502 recognizes that UE 102 has registered twice with IMS server 104. In an embodiment, S-CSCF 502 creates a record 510 in a Home Subscriber Server (HSS) 508 for UE 102, which associates the private (and a public) identity of UE 102 with the WLAN-based contact and the cellular network-based contact of UE 102. In an embodiment, the private identity of UE 102 includes the International Mobile Station Equipment Identity (IMEI) of UE 102, which is a unique number that identifies UE 102. Other types of private identities can also be used such as a USIM (Universal Subscriber Identity Module) generated identity or an ISIM (IP Multimedia Service Identity Module) generated identity. In addition, each registration includes a public identity which identifies the user to IMS server 104, and which is used to establish communication with other users. The public identity can be the user's phone number, for example.

Having registered with two (or more) contacts with IMS server 104, an incoming media call or SMS for UE 102 (absent any configuration otherwise) is forked by S-CSCF 502 onto both P-CSCF 504 and P-CSCF 506 for simultaneous delivery over both paths 512 and 514 to UE 102 (S-CSCF 502 forks the incoming media call to all Addresses of Record (AOR) of UE 102). If UE 102 is connected to both the cellular network and the WLAN over which it had registered, UE 102 can select whether to establish the media call data flow over the WLAN network (using path 512) or the cellular network (using path 514). For example, the user can be prompted to make a selection. Otherwise, if UE 102 is connected only to the cellular network (or the WLAN network), UE 102 can establish the media call flow over the cellular network (or the WLAN network). Subsequently, however, if UE 102 becomes connected again to the WLAN network (previously registered with IMS server 104), UE 102 can request a redirection of the media call data flow onto the WLAN network by sending a SIP INVITE message to IMS server 104. Handover from the cellular network to the WLAN network can occur very rapidly because paths 512 and 514 were established by previous registration. Specifically, the handover latency is reduced by eliminating any packet data network (PDN) connection establishment time, any IPv6 address allocation time, and the IMS registration time.

In another embodiment, UE 102 can specify within each registration the media service type (e.g., audio, video, SMS) that UE 102 desires to receive on the provided contact. S-CSCF 502 can then route incoming media calls or SMS accordingly, without forking to all AORs associated with UE 102. For example, UE 102 can register to receive voice/video calling through the WLAN network and voice calling/SMS through the cellular network. Other configurations can be also be used as would be understood by a person of skill in the art.

Figure 6:
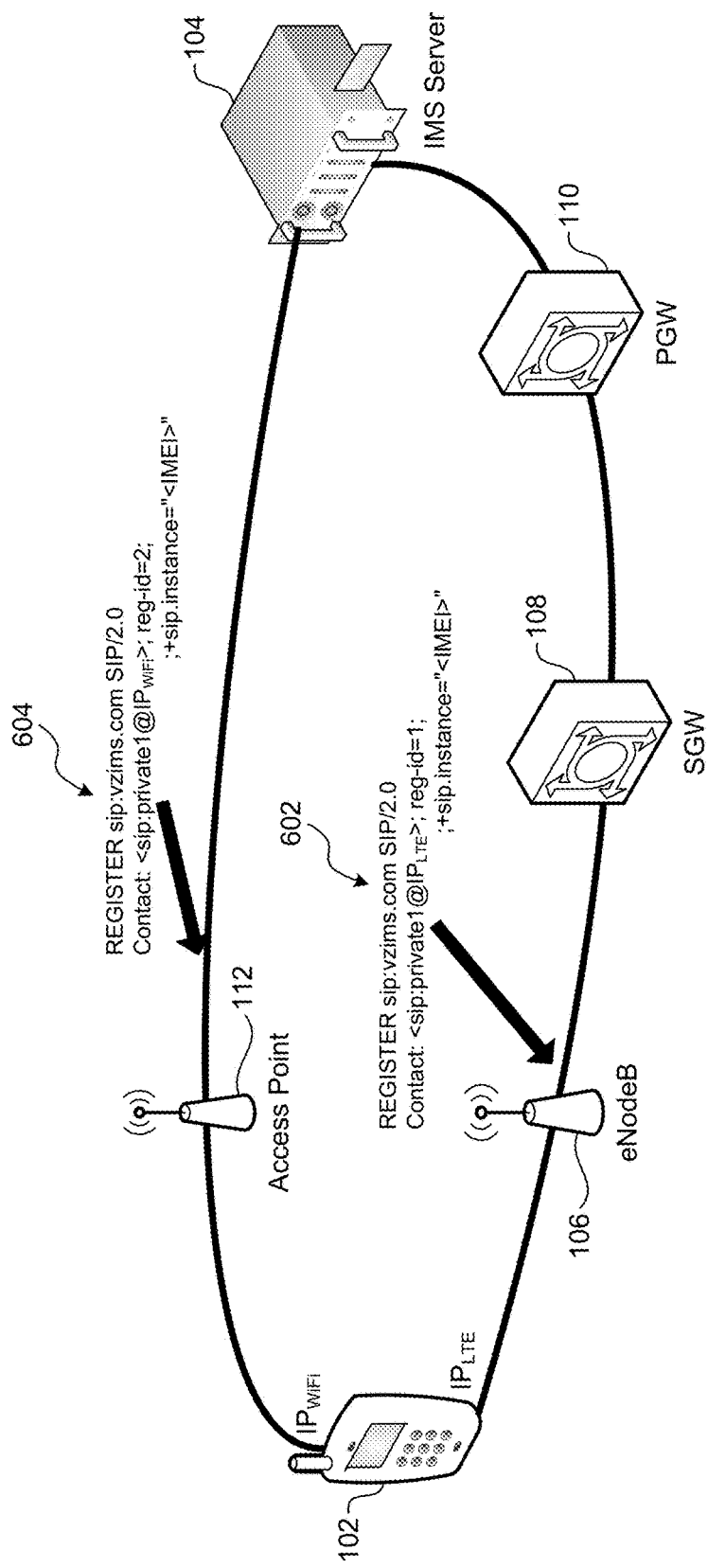
FIG. 6 illustrates another example dual instance registration process according to an embodiment.

FIG. 6 illustrates another example dual instance registration process according to an embodiment. This example process is provided for the purpose of illustration only and is not limiting of embodiments. For the purpose of illustration only, the example process is described with respect to a simplified version of example network 100, which omits ePDG 114.

As shown in FIG. 6, dual instance registration according to this embodiment includes UE 102 sending a first registration 602, via eNodeB 106, and a second registration 604, via WLAN AP 112, to IMS server 104. In an embodiment, first registration 602 and second registration 604 are SIP REGISTER messages. Registration 602 specifies a cellular-based contact <sip: private1@$IP_{LTE}$> which identifies a cellular network-assigned IP address. Registration 604 specifies a WLAN-based contact <sip: private1@$IP_{WIFI}$> which identifies a WLAN-assigned IP address. Both registrations 602 and 604 include the same private identity "private1". As such, a different registration id value (reg-id=1 and reg-id=2) is used in each registration, which indicates to IMS server 104 that registration 604 is a second registration of UE 102.

Figure 7:
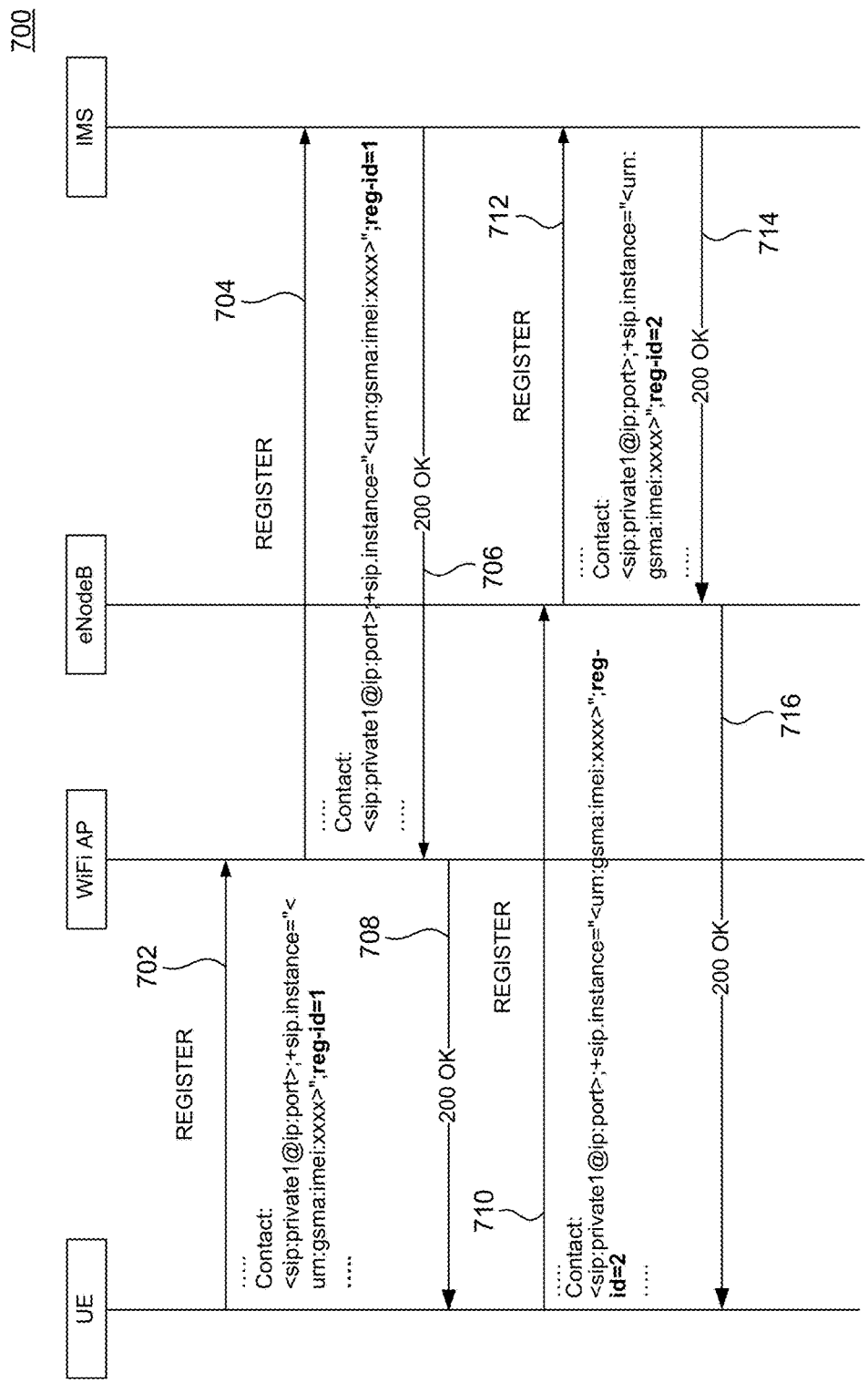
FIG. 7 illustrates an example call flow for performing a dual instance registration according to an embodiment.

FIG. 7 illustrates an example call flow 700 for performing a dual instance registration according to an embodiment. Example call flow 700 is provided for the purpose of illustration only and is not limiting of embodiments. As shown in FIG. 7, example call flow 700 begins in step 702, which includes the UE sending a SIP REGISTER message, via a WLAN AP, to the IMS server. The SIP REGISTER message includes a WLAN-based contact of the UE, a private identity (e.g., IMEI) of the UE, and a registration id value equal to 1. In step 704, the WLAN AP forwards the SIP REGISTER message to the IMS server. In response to the SIP REGISTER message, the IMS server registers the UE by creating a record for the UE that associates the UE's private (and public) identity with the provided WLAN-based contact, and sends in step 706 a SIP OK message to the WLAN AP, which forwards the SIP OK message in step 708 to the UE. Subsequently, in step 710, the UE sends another SIP REGISTER message, via a cellular network eNodeB, to the IMS server. The SIP REGISTER message includes a cellular network-based contact of the UE, the same private identity of the UE, and a registration id value equal to 2. In step 712, the eNodeB forwards the SIP REGISTER message to the IMS server. The registration id value indicates to the IMS server that the SIP REGISTER is a second registration of the UE. In response to the SIP REGISTER message, the IMS server registers the UE again by associating the provided cellular network-based contact of the UE with the UE's private (and public) identity in the previously created record. The IMS server then sends in step 714 a SIP OK message to the eNodeB, which forwards the SIP OK message in step 716 to the UE.

Figure 8:
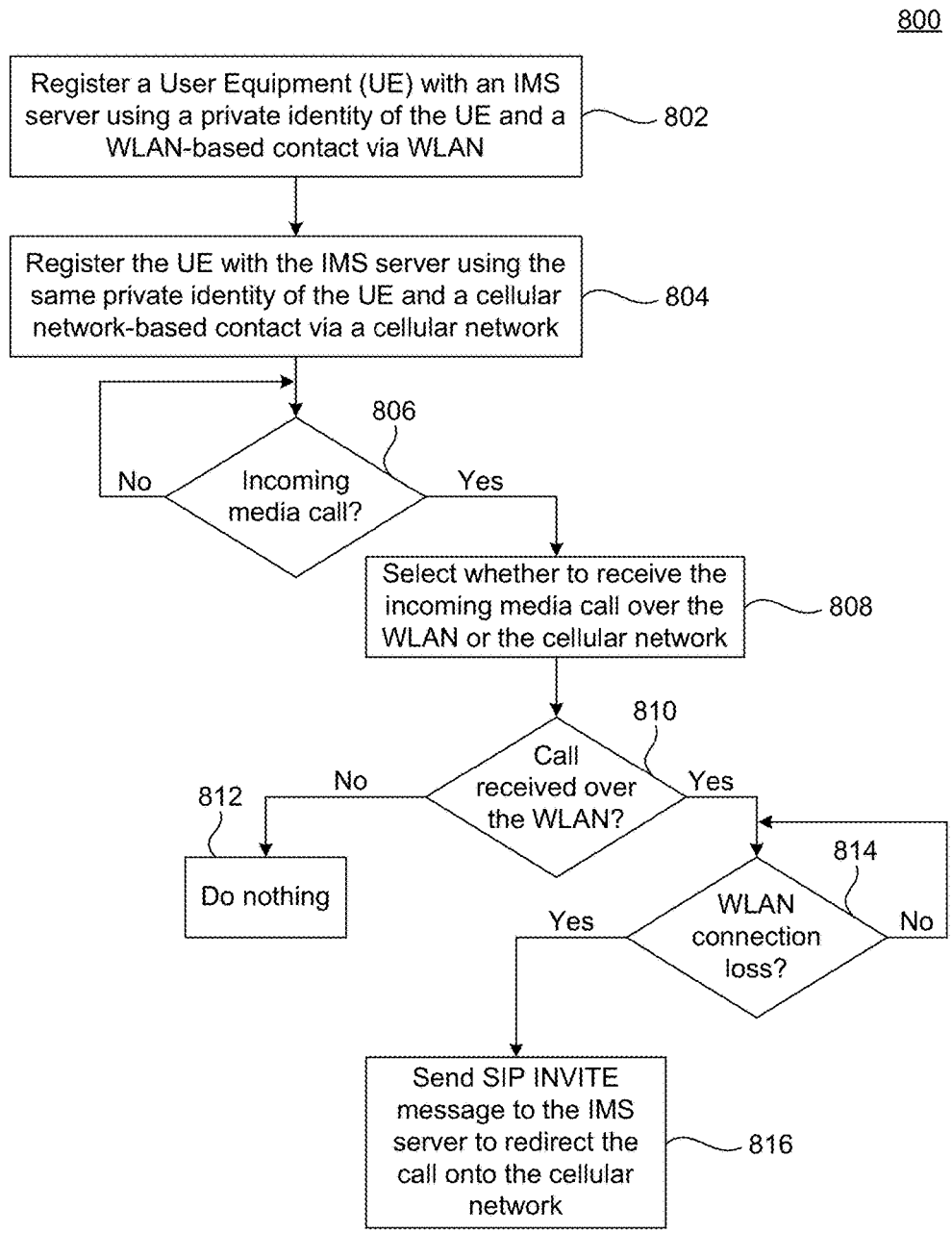
FIG. 8 illustrates another example process according to an embodiment.

FIG. 8 illustrates another example process 800 according to an embodiment. Example process 800 is provided for the purpose of illustration only and is not limiting of embodiments. Example process 800 can be performed by a UE according to an embodiment.

As shown in FIG. 8, process 800 begins in step 802, which includes registering the UE, via a WLAN, with an IMS server using a first private identity and a WLAN-based contact of the UE. In an embodiment, step 802 includes sending over the WLAN a first SIP REGISTER message from the UE to the IMS server. In an embodiment, the WLAN-based contact includes a WLAN-assigned IP address of the UE.

Subsequently, step 804 includes registering the UE, via a cellular network, with the IMS server using a second private identity and a cellular network-based contact of the UE. In an embodiment, step 804 includes sending over the cellular network a second SIP REGISTER message from the UE to the IMS server. In an embodiment, the cellular-based contact includes a cellular network-assigned IP address. The second private identity can be the same as the first private identity as discussed above with respect to the dual instance registration process or different as further discussed below with respect to the dual device registration process.

Then, in step 806, process 800 includes determining whether a notification of an incoming media call to the UE is received. If not, process 800 returns to step 806. Otherwise, if an incoming media call is received, process 800 proceeds to step 808, which includes selecting whether to receive the incoming media call over the WLAN or the cellular network. In an embodiment, the notification of the incoming media call is received using only the cellular network-based contact of the UE. In another embodiment, the notification of the incoming call is receiver using both the cellular network-based contact and the WLAN-based contact of the UE. In an embodiment, the notification of the incoming media call to the UE includes a SIP INVITE message from the IMS server.

Process 800 can terminate in step 808 in an embodiment. In another embodiment, process 800 includes additional steps. Specifically, in step 810, process 800 includes determining whether the media call was received over the WLAN. If not, process 800 terminates in step 812. Otherwise, process 800 proceeds to step 814, which includes determining whether or not a connection between the UE and the WLAN has been lost (or degraded below a desired level). If not, process 800 returns to step 814. Otherwise, process 800 proceeds to step 816, which includes sending, over the cellular network, a SIP INVITE message from the UE to the IMS server, the SIP INVITE message requesting a redirection of the media call from the WLAN to the cellular network.

Figure 9:
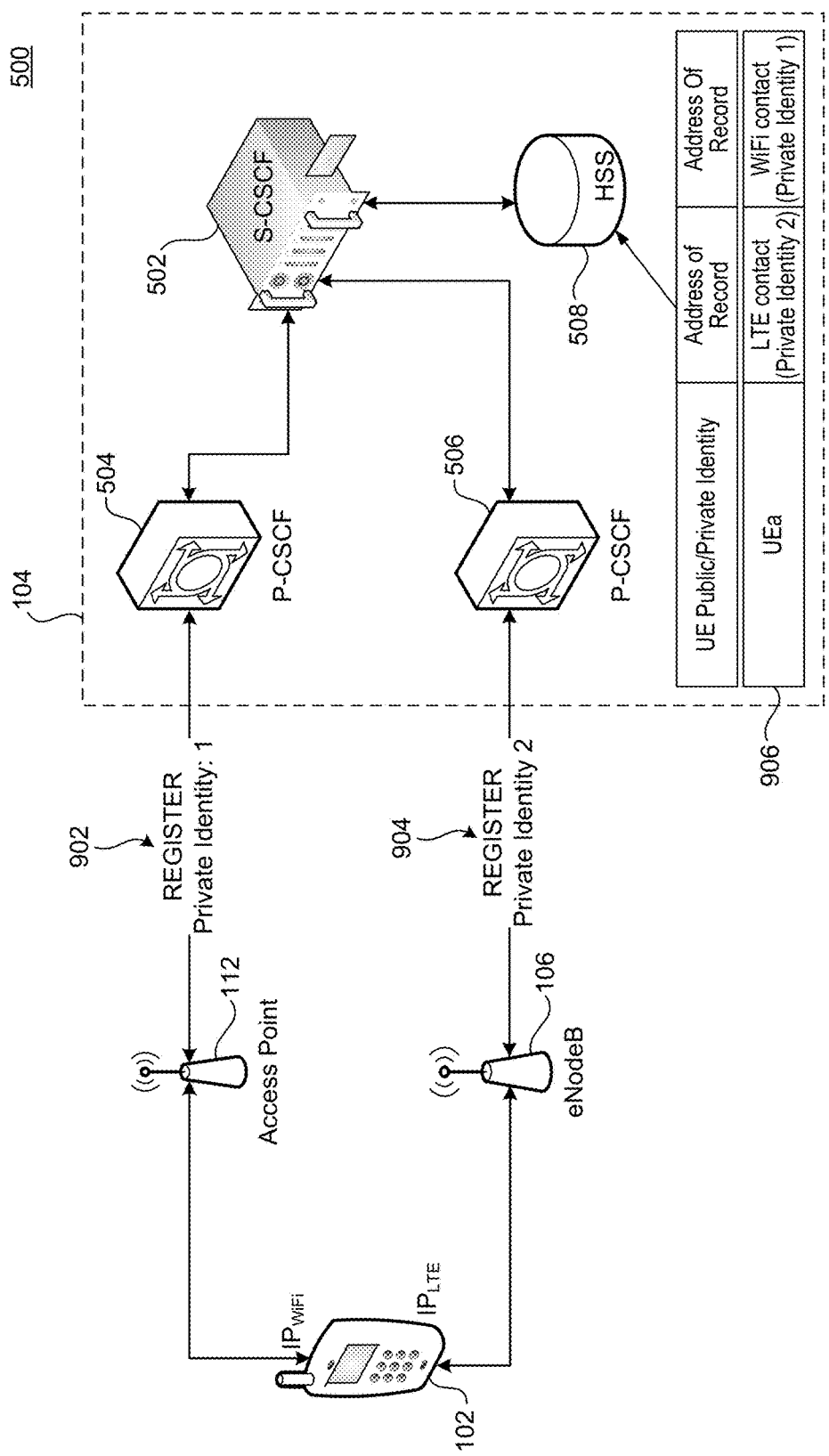
FIG. 9 illustrates an example dual device registration process according to an embodiment.

FIG. 9 illustrates an example dual device registration process according to an embodiment. This example process is provided for the purpose of illustration only and is not limiting of embodiment. For the purpose of illustration only, the example process is described with respect to example network 500, described above with respect to FIG. 5.

Dual device registration according to an embodiment includes registering the UE, via the WLAN, with IMS server 104 using a first private identity of the UE and a WLAN-based contact of the UE; and registering the UE, via the cellular network, with IMS server 104 using a second private identity and a cellular network-based contact of the UE. The second private identity is different than the first private identity. As would be understood by a person of skill in the art, the UE can be registered with more than one WLAN according to embodiments.

Registration via the WLAN can be simultaneous with, before, or after the registration via the cellular network. In an embodiment, UE 102 registers with IMS server 104, via the cellular network, on power up after attachment with the cellular network. If cellular attachment is lost, UE 102 re-registers with IMS server 104, via the cellular network, when UE 102 is able to re-attach to the cellular network. Similarly, UE 102 can register or re-register with IMS server 104, via one or more WLANs, when a WLAN connection is present. UE 102 can also de-register from IMS server 104 (via the WLAN or the cellular network). As shown in FIG. 9, registration via the WLAN establishes a path 902 that includes P-CSCF 504 between UE 102 and S-CSCF 502, and registration via the cellular network establishes a path 904 that includes P-CSCF 506 between UE 102 and S-CSCF 502.

By using different private identities in the two registrations, the UE appears like two devices to S-CSCF 502. However, S-CSCF 502 can associate the two registrations together based on the public identity (which is the same) provided in each registration to create a record 906 for the UE in HSS 508. In an embodiment, the first and second private identities are derived from the IMEI of the UE. By using two different private identities, the IMS operator can treat services provided over the WLAN network and the cellular network separately for purposes of billing, for example.

Having registered with two (or more) contacts with IMS server 104, the processing of incoming/outgoing media calls or SMS is similar to the dual instance registration process described above. Specifically, an incoming media call or SMS for UE 102 (absent any configuration otherwise) is forked by S-CSCF 502 onto both P-CSCF 504 and P-CSCF 506 for simultaneous delivery over both paths 902 and 904 to UE 102. If UE 102 is connected to both the cellular network and the WLAN over which it had registered, UE 102 can select whether to establish the media call data flow over the WLAN network (using path 902) or the cellular network (using path 904). For example, the user can be prompted to make a selection. Otherwise, if UE 102 is connected only to the cellular network (or the WLAN network), UE 102 can establish the media call flow over the cellular network (or the WLAN network). Subsequently, however, if UE 102 becomes connected again to the WLAN network (previously registered with IMS server 104), UE 102 can request a redirection of the media call data flow onto the WLAN network by sending a SIP INVITE message to IMS server 104. Handover from the cellular network to the WLAN network can occur very rapidly because paths 902 and 904 were established by previous registration. Specifically, the handover latency is reduced by eliminating any packet data network (PDN) connection establishment time, any IPv6 address allocation time, and the IMS registration time.

In another embodiment, UE 102 can specify within each registration the media service type (e.g., audio, video, SMS) that UE 102 desires to receive on the provided contact. S-CSCF 502 can then route incoming media calls or SMS accordingly, without forking to all AORs associated with UE 102. For example, UE 102 can register to receive voice/video calling through the WLAN network and voice calling/SMS through the cellular network. Other configurations can be also be used as would be understood by a person of skill in the art.

Figure 10:
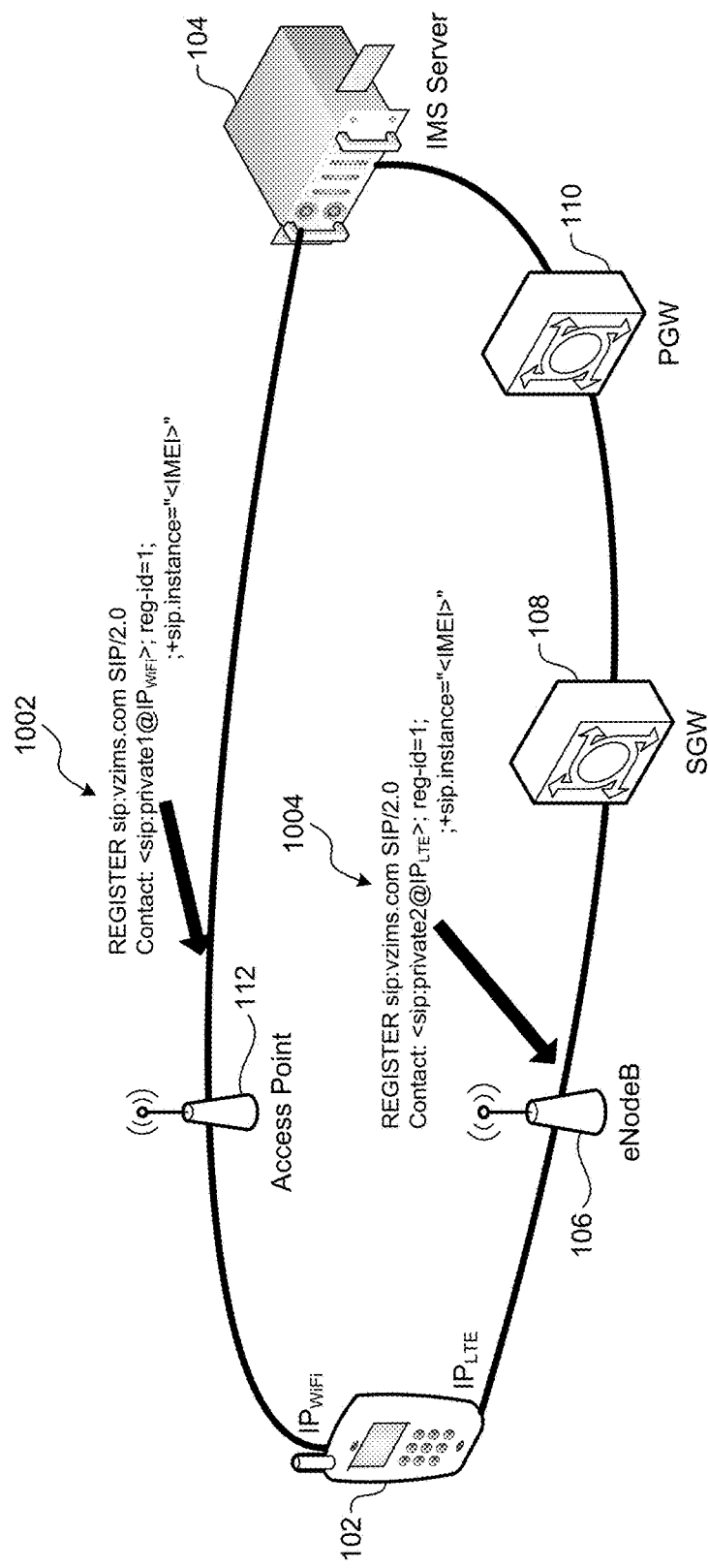
FIG. 10 illustrates another example dual device registration process according to an embodiment.

FIG. 10 illustrates another example dual device registration process according to an embodiment. This example process is provided for the purpose of illustration only and is not limiting of embodiment. For the purpose of illustration only, the example process is described with respect to a simplified version of example network 100, which omits ePDG 114.

As shown in FIG. 10, dual device registration according to this embodiment includes UE 102 sending a first registration 1002, via WLAN AP 112, and a second registration 1004, via eNodeB 106, to IMS server 104. In an embodiment, first registration 1002 and second registration 1004 are SIP REGISTER messages. Registration 1002 specifies a WLAN-based contact <sip: private1@$IP_{WIFI}$> which identifies a WLAN-assigned IP address. Registration 1004 specifies a cellular network-based contact <sip: private2@$IP_{LTE}$> which identifies a cellular network-assigned IP address. Registrations 1002 and 1004 include different private identities "private1" and "private2" respectively. Because different private identities are used, the SIP REGISTER messages include the same registration id value (reg-id=1) to indicate the first registration using each of the two private identities.

Figure 11:
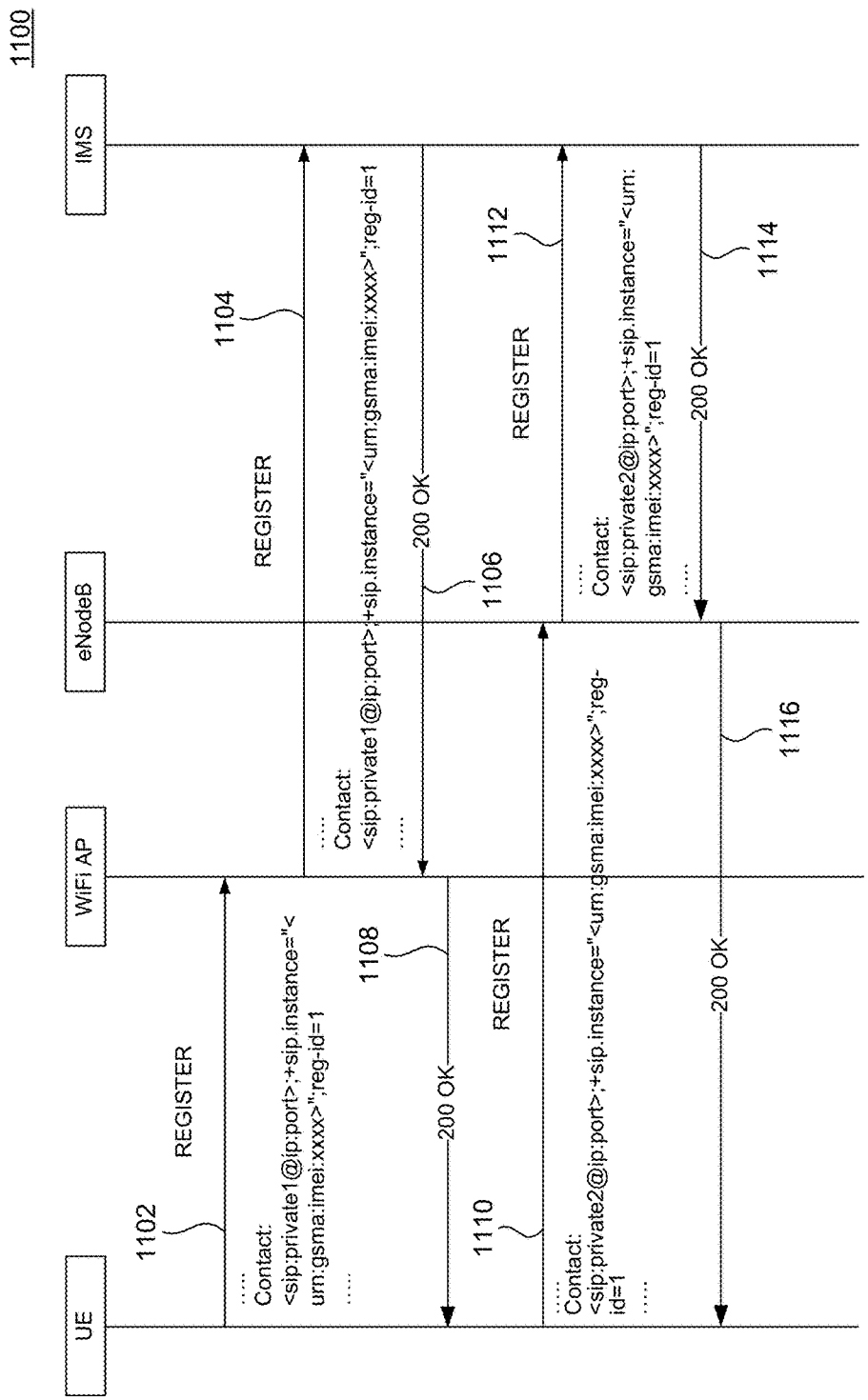
FIG. 11 illustrates an example call flow for performing a dual device registration according to an embodiment.

FIG. 11 illustrates an example call flow 1100 for performing a dual device registration according to an embodiment. Example call flow 1100 is provided for the purpose of illustration only and is not limiting of embodiments. As shown in FIG. 11, example call flow 1100 begins in step 1102, which includes the UE sending a SIP REGISTER message, via a WLAN AP, to the IMS server. The SIP REGISTER message includes a WLAN-based contact of the UE, a first private identity ("private 1") of the UE, and a registration id value equal to 1. In step 1104, the WLAN AP forwards the SIP REGISTER message to the IMS server. In response to the SIP REGISTER message, the IMS server registers the UE by creating a record for the UE that associates the UE's public identity with the first private identity and the provided WLAN-based contact, and sends in step 1106 a SIP OK message to the WLAN AP, which forwards the SIP OK message in step 1108 to the UE. Subsequently, in step 1110, the UE sends another SIP REGISTER message, via a cellular network eNodeB, to the IMS server. The SIP REGISTER message includes a cellular network-based contact of the UE, a second private identity ("private 2") of the UE, and a registration id value equal to 1. In step 1112, the eNodeB forwards the SIP REGISTER message to the IMS server. In response to the SIP REGISTER message, the IMS server registers the UE again by associating the UE's public identity with the second private identity and the provided cellular network-based contact of the UE within the same record. The IMS server then sends in step 1114 a SIP OK message to the eNodeB, which forwards the SIP OK message in step 1116 to the UE.

Figure 13:
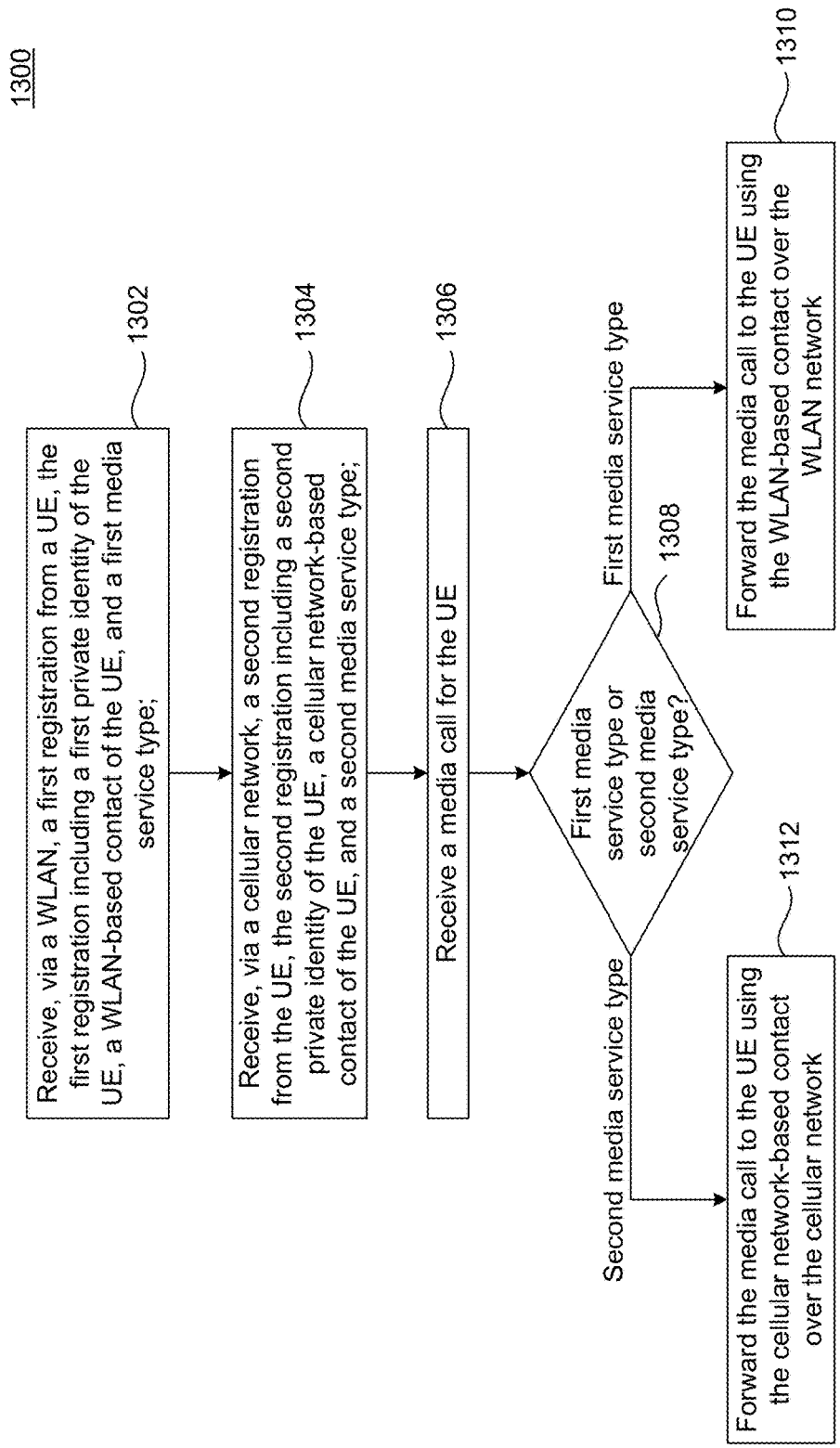
FIG. 13 illustrates an example process according to an embodiment.

FIG. 13 illustrates an example process 1300 according to an embodiment. Example process 1300 is provided for the purpose of illustration only and is not limiting of embodiments. Example process 1300 can be performed by an IMS server according to an embodiment.

As shown in FIG. 13, process 1300 begins in step 1302, which includes receiving, via a WLAN, a first registration from a UE, the first registration including a first private identity of the UE, a WLAN-based contact of the UE, and a first media service type. In an embodiment, step 1302 is performed by a P-CSCF of the IMS server, dedicated for processing WLAN-based SIP traffic.

Then, in step 1304, process 1300 includes receiving, via a cellular network, a second registration from the UE, the second registration including a second private identity of the UE, a cellular network-based contact of the UE, and a second media service type. In an embodiment, step 1304 is performed by a P-CSCF of the IMS server, dedicated for processing cellular network-based SIP traffic. The first private identity and the second private identity are the same or different.

Then, in step 1306, process 1300 includes receiving a media call for the UE. The media call can be from another UE and can include voice, video, and/or SMS. Subsequently, step 1308 includes determining whether the media call is of a first media service type or a second media service type. In another embodiment, the media call can be compared against more than two media service types in step 1308.

If the media call is of the first media service type, process 1300 proceeds to step 1310, which includes forwarding the media call to the UE using the WLAN-based contact over the WLAN network. Otherwise, process 1300 proceeds to step 1312, which includes forwarding the media call to the UE using the cellular network-based contact over the cellular network. In an embodiment, the first media service type includes voice calling and the second media service type includes Short Message Service (SMS). In another embodiment, the first media service type includes video calling and the second media service type includes voice calling.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of embodiments of the present disclosure should not be limited by any of the above-described exemplary embodiments, but should be defined only in accordance with the following claims and their equivalents.

What is claimed is:

1. A method performed by a User Equipment (UE), comprising:
   registering the UE, via a Wireless Local Area Network (WLAN), with an Internet Protocol (IP) Multimedia Subsystem (IMS) server using a first private identity of the UE, a first registration identification number, and a WLAN-based contact of the UE;
   registering the UE, via a cellular network, with the IMS server using a second private identity of the UE, a second registration identification number, and a cellular network-based contact of the UE;
   receiving a notification of an incoming media call to the UE, wherein receiving the notification of the incoming media call to the UE comprises receiving the notification using both the cellular network-based contact and the WLAN-based contact of the UE; and
   selecting, responsive to the notification, whether to receive the incoming media call over the WLAN or the cellular network;
   wherein the second registration identification number is different from the first registration identification number.

2. The method of claim 1, wherein registering the UE, via the WLAN, comprises sending over the WLAN a first Session Initiation Protocol (SIP) REGISTER message from the UE to the IMS server, and wherein registering the UE, via the cellular network, comprises sending over the cellular network a second SIP REGISTER message from the UE to the IMS server.

3. The method of claim 1, wherein the first private identity and the second private identity are the same.

4. The method of claim 1, wherein the first private identity and the second private identity are different.

5. The method of claim 1, wherein the WLAN-based contact of the UE comprises a WLAN-assigned IP address and the cellular network-based contact of the UE comprises a cellular network-assigned IP address.

6. The method of claim 1, wherein the notification of the incoming media call to the UE comprises a Session Initial Protocol (SIP) INVITE message from the IMS server.

7. The method of claim 1, wherein the first registration number and the second registration number identify respective first and second distinct registrations with the IMS server.

8. The method of claim 1, wherein the WLAN is selected to receive the incoming media call, the method further comprising;
   detecting degradation of a connection between the UE and the WLAN; and
   sending, over the cellular network, a Session Protocol (SIP) INVITE message from the UE to the IMS server in response to detecting the degradation of the connection between the UE and the WLAN, the SIP INVITE message requesting a redirection of the media call from the WLAN to the cellular network.

9. The method of claim 8, wherein the SIP INVITE message includes the cellular network-based contact of the UE.

10. A method performed by a User Equipment (UE), comprising:
    registering the UE, via a Wireless Local Area Network (WLAN), with an Internet Protocol (IP) Multimedia Subsystem (IMS) server using a first private identity of the UE, a first registration identification number, and a WLAN-based contact of the UE;
    registering the UE, via a cellular network, with the IMS server using a second private identity of the UE, a second registration identification number, and a cellular network-based contact of the UE; and receiving a split traffic flow from the IMS server such that the UE receives signaling packets from the IMS server over a first network that is one of the WLAN or the cellular network, and receives data packets from the IMS server over a second network that is the other of the WLAN or cellular network;

wherein the second registration identification number is different from the first registration identification number.

11. The method of claim 10, wherein the data packets comprise Real-time Transport Protocol (RTP) packets.

12. The method of claim 10, wherein the signaling packets comprise Session Initiation Protocol (SIP) messages.

13. The method of claim 10, wherein the first network is the cellular network and the second network is the WLAN.

14. The method of claim 10, wherein registering the UE, via the WLAN, comprises sending over the WLAN a first Session Initiation Protocol (SIP) REGISTER message from the UE to the IMS server, and wherein registering the UE, via the cellular network, comprises sending a second SIP REGISTER message from the UE to the IMS server.

15. The method claim 10, wherein the first private identity and the second private identity are the same.

16. The method of claim 10, wherein the first private identity and the second private identity are different.

17. The method of claim 10, wherein the WLAN-based contact of the UE comprises a WLAN-assigned IP address and the cellular network-based contact of the UE comprises a cellular network-assigned IP address.

18. The method of claim 10, wherein the first registration identification number and the second registration identification number identify respective first and second distinct registrations with the IMS server.

19. The method of claim 10, wherein the first network is the cellular network and the second network is the WLAN, the method further comprising:

detecting a degradation of a connection between the UE and the WLAN; and sending, over the cellular network, a Session Initial Protocol (SIP) INVITE message from the UE to the IMS server in response to detecting the degradation of the connection between the UE and the WLAN, the SIP INVITE message requesting a redirection of the data packets from the WLAN to the cellular network.

20. The method of claim 19, wherein the SIP INVITE message includes the cellular network-based contact of the UE.

* * * * *